United States Patent
Ohgose (10) Patent No.: US 8,184,706 B2
(45) Date of Patent: May 22, 2012

(54) MOVING PICTURE CODING APPARATUS AND METHOD WITH DECIMATION OF PICTURES

(75) Inventor: Hideyuki Ohgose, Osaka (JP)

(73) Assignee: Panasonic Corporation, Osaka (JP)

( * ) Notice: Subject to any disclaimer, the term of this patent is extended or adjusted under 35 U.S.C. 154(b) by 960 days.

(21) Appl. No.: 12/186,067

(22) Filed: Aug. 5, 2008

(65) Prior Publication Data

US 2009/0041125 A1 Feb. 12, 2009

(30) Foreign Application Priority Data

Aug. 8, 2007 (JP) ................................. 2007-207143

(51) Int. Cl.
*H04N 7/12* (2006.01)
(52) U.S. Cl. .................................................. 375/240.16
(58) Field of Classification Search ............. 375/240.01, 375/240.16; *H04N 7/12*
See application file for complete search history.

(56) References Cited

U.S. PATENT DOCUMENTS

| | | | |
|---|---|---|---|
| 5,617,144 A * | 4/1997 | Lee | 375/240.16 |
| 6,690,729 B2 | 2/2004 | Hayashi | |
| 6,975,681 B2 | 12/2005 | Ishikawa | |
| 7,006,698 B2 * | 2/2006 | Adiletta et al. | 382/236 |
| 2001/0002922 A1 | 6/2001 | Hayashi | |
| 2002/0168008 A1 | 11/2002 | Ishikawa | |
| 2007/0025444 A1 | 2/2007 | Okada et al. | |
| 2007/0098075 A1 | 5/2007 | Ohgose et al. | |

FOREIGN PATENT DOCUMENTS

| | | |
|---|---|---|
| JP | 2001-169288 | 6/2001 |
| JP | 2002-335529 | 11/2002 |
| JP | 2007-67796 | 3/2007 |
| JP | 2007-124408 | 5/2007 |

* cited by examiner

*Primary Examiner* — Y Lee
*Assistant Examiner* — Tracy Li
(74) *Attorney, Agent, or Firm* — Wenderoth, Lind & Ponack, L.L.P.

(57) ABSTRACT

A motion vector estimating device estimating a motion vector having high accuracy is provided. An eliminating unit eliminates each of pictures in a set of input pictures for each picture. A picture reducing unit reduces left pictures after the elimination, and generates reduced pictures. An overall motion vector estimating unit reads the reduced pictures, stored in the frame memory, as either reduced inputted pictures or reduced reference pictures, and estimates an overall motion vector between reduced pictures. Based on the overall motion vector estimated between the reduced pictures, a correction motion vector calculating unit calculates a motion vector between two reduced pictures as a correction motion vector. The correction motion vector calculating unit calculates the motion vector in the order of the inputted pictures in a pre-eliminated set of input pictures. A coding unit estimates the motion vector for each macroblock, using a determined search range, and performs cording processing.

10 Claims, 11 Drawing Sheets

MOVING PICTURE CODING APPARATUS AND METHOD WITH DECIMATION OF PICTURES

BACKGROUND OF THE INVENTION (1) Field of the Invention

The present invention relates to moving picture coding apparatuses which code a moving picture, using inter-frame prediction, and more particularly, to a technique to determine a search range utilized for estimating an inter-frame motion vector.

(2) Description of the Related Art

In picture compression techniques utilizing correlation between pictures in a moving picture, such as the MPEG (Moving Picture image coding Experts Group) technique, a motion vector needs to be estimated for each block to be motion compensated. A typical technique to estimate a motion vector having a high accuracy is to extend a search range in order to enhance motion vector estimation accuracy. The extended search range, however, causes processing amount per current picture to be increased (since the number of blocks to be processed times a search range equals to amount to be processed), followed by an increase in amount of memory for the processing. Thus, motion vectors need to be accurately estimated without expanding the search range (See Patent Reference 1: Japanese Unexamined Patent Application Publication No. 2001-169288).

A technique in Patent Reference 1 estimates motion vectors on an entire picture in the order of inputted pictures, and then calculates motion vectors between an input picture and a reference picture in accordance with the estimated motion vectors. Based on the calculated motion vectors, the technique in the Patent Reference 1 determines a search range for estimating motion vectors on a macro block-to-macro block basis.

Patent Reference 1: Japanese Unexamined Patent Application Publication No. 2001-169288

The recent launch of digital broadcasting by broadcasting satellites and with terrestrial waves increases high demand for compression coding on a high-resolution HD (High Definition) format picture (referred to as a "HD picture" hereinafter).

The HD picture, meanwhile, has approximately six times as many pixels as a conventional SD (Standard Definition) picture. Thus, processing amount calculated by multiplying the number of blocks to be processed with a search range is required in order for the HD picture to achieve motion vector estimation accuracy as high as the motion vector estimation accuracy of the SD picture. In addition, the H. 264 standard includes as many as seven types of motion compensation sizes, so that the HD picture requires three times as much processing amount as the MPEG-2 standard requires. Thus, compression coding on the HD picture by the H. 264 standard requires several tens of times as great the amount of blocks as coding on the conventional SD picture.

Typical motion vector searching techniques narrow search ranges by estimating motion between two pictures in input pictures, and then determining motion vector search ranges on a macro block-to-macro block basis. Here, in the case where the inputted pictures are HD pictures, motion estimation of an entire picture, using all pixels, requires a significant quantity for processing since a large number of pixels are included in the HD pictures. In addition, Patent Reference 1 describes that pictures can be either reduced or eliminated in order to reduce the amount of processing. In the case where the entire picture moves slowly, (especially in the case where motion on a picture is observed approximately as great as the number of pixels with a fifty-percent reduction rate) the movement is rounded into either "0" or one pixel in a reduced picture. As a result, in the case where a p-picture three pictures before is a reference picture, a movement error between two pictures is accumulated. Thus, the search range cannot be reduced, which increases memory amount.

For example, a reduction rate of $\frac{1}{16}$ causes a margin of error of plus or minus eight pixels. Here, when the p-picture refers to a picture three frames before, a margin of an error of plus or minus 24 pixels; namely three times, that is an error of plus-minus eight pixels time three. Since the search range should be set to include the margin of the error of plus or minus 24 pixels, an amount of processing cannot be reduced.

SUMMARY OF THE INVENTION

The present invention is conceived in view of the above problems and has as an objective to provide a moving picture coding apparatus and a method thereof which can estimate a motion vector having high accuracy, as well as reduce an amount of processing.

In order to solve the above problems, a motion vector estimating device in the present invention is a moving picture coding apparatus which codes a current picture, on a predetermined block-to-block basis, out of a set of input pictures, the moving picture coding apparatus including: an eliminating unit which eliminates a predetermined picture from the set of input pictures; an overall motion vector estimating unit which estimates an overall motion vector representing a motion vector between two pictures in the set of input pictures after the elimination; a correction motion vector calculating unit which calculates a correction motion vector representing a motion vector for the current picture, based on the estimated overall motion vector and a ratio between a first time interval and a second time interval, the first time interval representing a time interval between the two pictures used for estimating the overall motion vector, and the second time interval representing a time interval between the current picture and a reference picture corresponding to the current picture; a search range determining unit which determines a search range of the current block, based on the calculated correction motion vector and a predetermined coding condition; and a coding unit which estimates a motion vector of the current block in the determined search range, and to code the current block with use of the motion vector.

This can estimate a motion vector having high accuracy, as well as reduce processing amount.

In addition, the present invention can be implemented as an integrated circuit including characteristic structural units in the above moving picture coding apparatus, and achieved as a picture coding method utilizing the characteristic structural units as steps, as well as the moving picture coding apparatus described above. Further, the present invention can be realized as a program to cause a computer to execute the steps in the above method. The program can be widely distributed via transmission media, such as a DVD and the Internet.

The moving picture coding apparatus in the present invention can: reduce margin of errors of motion vectors between pictures by estimating motion vectors on an entire picture after performing elimination on a set of input pictures, and correcting the estimated motion vectors on the entire picture; and narrow search ranges required for estimating motion vectors for each of macroblocks to be coded. Thus, a processing amount and a memory amount needed for coding processing can be reduced.

Further Information About Technical Background To This Application

The disclosure of Japanese Patent Application No. 2007-207143 filed on Aug. 8, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

Embodiments in the present invention shall be described with reference to the drawings, hereinafter. It is noted that descriptions in the present invention shall be provided, using the following embodiments and the drawings attached thereto. Since the descriptions are intended to exemplify the present invention, the present invention shall not be limited to the embodiments.

First Embodiment

Figure 1:
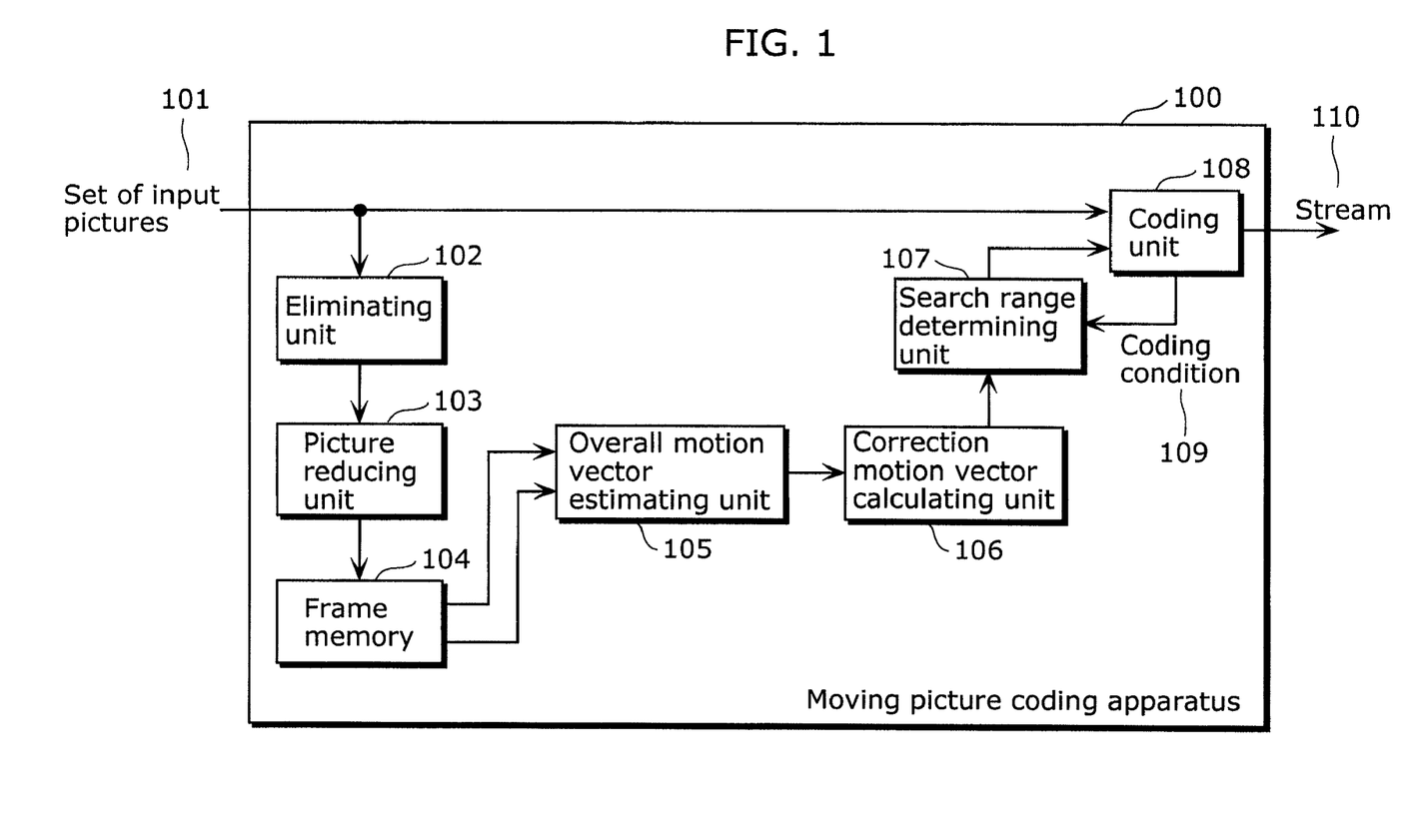
FIG. 1 is a block diagram showing a functional structure of a moving picture coding apparatus in a first embodiment.

FIG. 1 is a block diagram showing a functional structure of a moving picture coding apparatus 100 in a first embodiment of the present invention. As shown in FIG. 1, the moving picture coding apparatus 100 codes a current picture out of a set of input pictures on a predetermined current block-to-current block basis, and includes a eliminating unit 102, a picture reducing unit 103, a frame memory 104, an overall motion vector estimating unit 105, a correction motion vector calculating unit 106, a search range determining unit 107, and a coding unit 108. It is noted that, in FIG. 1, the eliminating unit 102 and the coding unit 108 receive a set of input pictures 101 in a chronological order. The coding unit 108 provides an coded stream 110.

Figure 2:
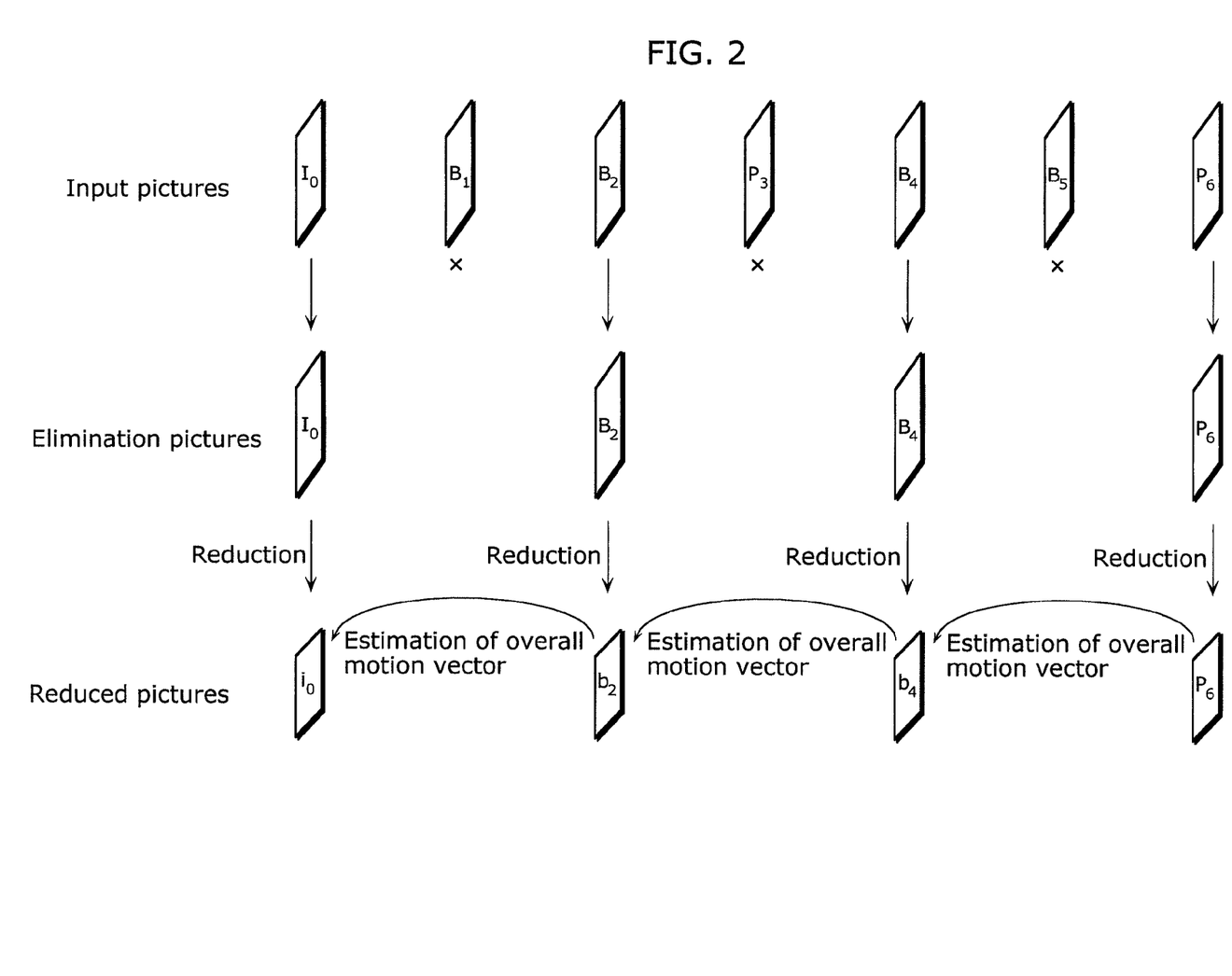
FIG. 2 shows an example of elimination performed on inputted pictures and relationship between input and reduced pictures.

The embodiment assumes that 60 frames a second (also referred to as "60 p") are provided as the set of input pictures 101, and the eliminating unit 102 eliminates the set of input pictures 101 on a picture-to-picture basis. The embodiment also assumes that the coding unit 108: codes the set of input pictures in conformity with the H.264 standard; and motion compensates the set of input pictures 101, utilizing the same referential relationship as coding in conformity with the MPEG-2 standard. In addition, the embodiment assumes that the motion vector estimation actually performed, on a macro block-to-macro block basis, by the coding unit 108 is subject to a search of one rectangular area to one reference picture. The eliminating unit 102 eliminates each of pictures (I0, B1, B2, P3, B4, B5, and P6) in the set of input pictures 101 on a picture-to-picture basis. Specifically, as shown in FIG. 2, the eliminating unit 102 eliminates every other picture in the set of input pictures 101 received at 60 p, and provides remaining pictures as a result of the elimination as elimination pictures (I0, B2, B4, and P6).

The picture reducing unit 103 reduces the elimination pictures to generate reduced pictures. Specifically, the picture reducing unit 103 generates the reduced pictures (i0, b2, b4, and p6) having the decreased number of pixels in each of the elimination pictures.

The frame memory 104 is, for example, a storing unit, such as RAM, and stores the reduced pictures generated by the picture reducing unit 103.

The overall motion vector estimating unit 105 reads the reduced pictures, stored in the frame memory 104, as either reduced inputted pictures or reduced reference pictures, and estimates an overall motion vector between reduced pictures. As shown in FIG. 2, specifically, the overall motion vector estimating unit 105 estimates the overall motion vector; namely, a coarse vector between a reduced input picture "b2" and a reduced reference picture "i0". The overall motion vector is estimated by block matching on the whole reduced input picture and the whole reduced reference picture.

Since the block matching is performed over the whole reduced input picture and the whole reduced reference picture, only a part of the reduced input picture and the reduced reference picture possibly overlaps. Here, an evaluation value in the above case is normalized to a case where the entire areas of both the reduced input picture and the reduced reference picture overlap (in the case where motion represents "0"). The overall motion vector estimating unit 105 estimates, to determine, a motion vector having a highest degree of correlation as the overall motion vector, based on an evaluation value calculated for every search location. The evaluation value includes: a sum of absolute values of pixel values differences; a sum of squares of pixel values differences; and variance, deviation, and covariance of pixel values differences.

Figure 3:
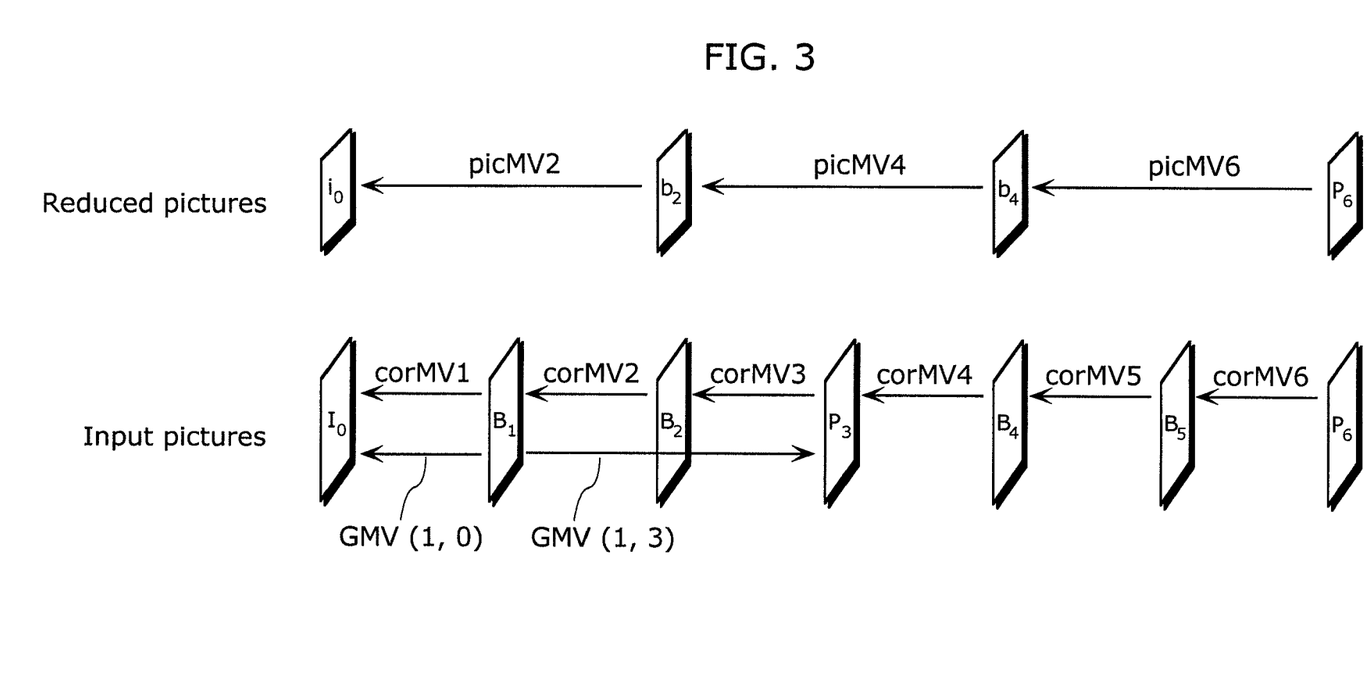
FIG. 3 shows an example of relationship among each of motion vectors in the first embodiment.

It is noted that an overall motion vector of the reduced input picture b2 to the reduced reference picture i0 is referred to as "picMV2", as shown in FIG. 3. An overall motion vector of the reduced input picture b4 to the reduced reference picture b2 is referred to as "picMV4", and a overall motion vector of the reduced input picture b6 to the reduced reference picture b4 is referred to as "picMV6", as well.

Based on the overall motion vector estimated between the reduced pictures, the correction motion vector calculating unit 106 calculates a motion vector between two reduced pictures as a correction motion vector. Here, the correction motion vector calculating unit 106 calculates the motion vector in the order of the inputted pictures in a pre-eliminated set of input pictures 101. As shown in FIG. 3, specifically, a correction motion vector of the input picture B1 to the input picture I0 is referred to as "corMV1", and a correction motion vector of the input picture B2 of the input picture B1 is referred to as "corMV2". These vectors are calculated with the following expressions, using the above picMV2:

$$\text{corMV1} = \text{picMV2}/2 \quad (1)$$

$$\text{corMV2} = \text{picMV2} - \text{corMV1} \quad (2)$$

It is noted that the correction motion vector calculated above is stored in a memory and used for determining a search range; however, a illustration thereof shall be omitted. In the MPEG-2 standard, picture types for a reference picture are I or P-picture. Thus, correction motion vectors for each picture between reference pictures need to be stored in a memory. According to FIG. 3, for example, corMV1, corMV2, and corMV3 need to be stored until the input picture B2 is coded.

Based on the correction motion vector calculated above and a coding condition 109, the search range determining unit 107 determines a search range for estimating the motion vector on a macro block-to-macro block basis. Here, the coding condition 109 includes, for example: a picture type of a picture to be coded, information indicating which picture is the reference picture, and the number of frames between the picture to be coded and the reference picture.

Using correction motion vectors in each picture between the picture to be coded and the reference picture, the search range determining unit 107 calculates, out of the coding condition 109, a overall motion vector between the picture to be coded and the reference picture.

As shown in FIG. 3, for example, the picture B1 is assumed to be a picture to be coded, and the pictures I0 and P3 are assumed to be reference pictures. Relations between correction motion vectors I0 and P3 (namely, corMV1, corMV2, and corMV3) are determined by the following equations (3) and (4):

$$\text{GMV}(1,0) = \text{corMV1} \quad (3)$$

$$\text{GMV}(1,3) = -(\text{corMV2} + \text{corMV3}) \quad (4)$$

where:
"GMV (1,0)" is an overall motion vector between B1 and I0, and "GMV (1,3)" is an overall motion vector between B1 and P3.

Figure 4A:
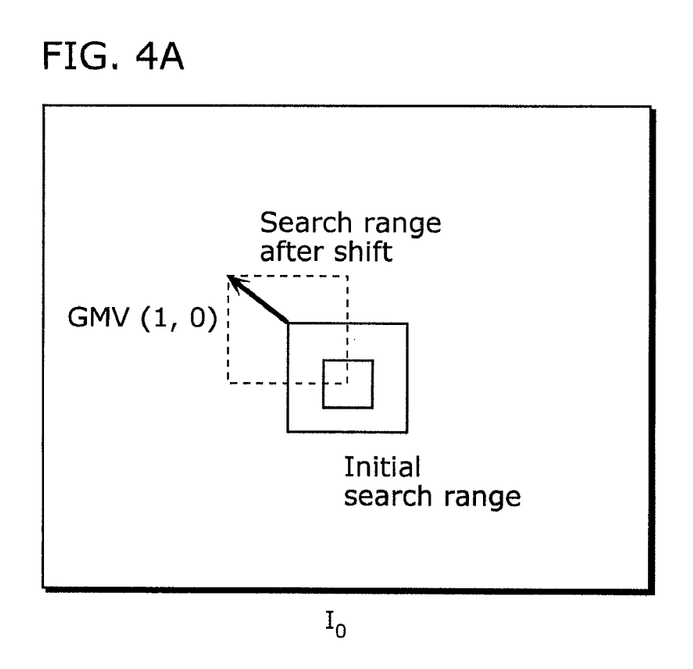
FIG. 4 are examples of a correction scheme of a search range.
Figure 4B:
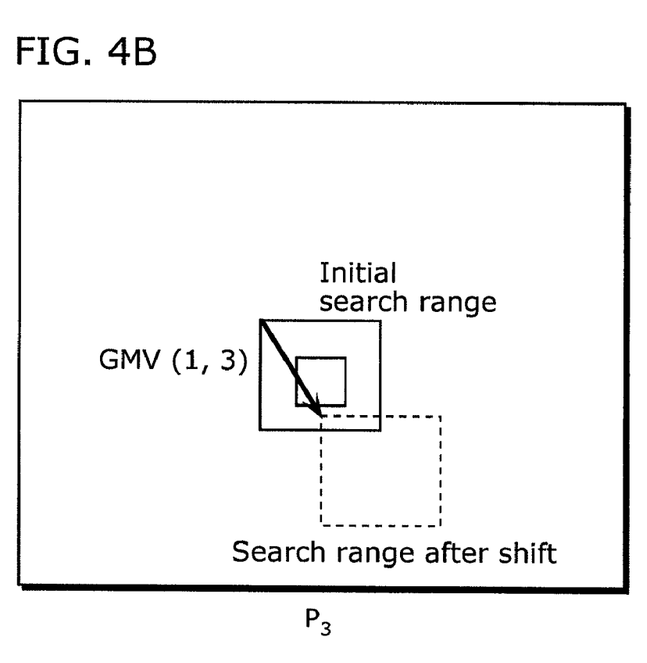

Next, based on the overall motion vector, the search range determining unit 107 determines the search range for each reference picture. As shown in FIG. 4, for example, the search range determining unit 107 sets an initial search range to be referred with a macroblock as a criterion. To the reference picture I0, a position of the search range is moved to "GMV (1,0). To the reference picture P3, the position of the search range is moved to "GMV (1,3)".

The coding unit 108: estimates the motion vector; and performs the coding processing to generate the stream. Here, the motion vector is estimated for each macro block, using the search range determined by the search range determining unit 107.

Figure 5:
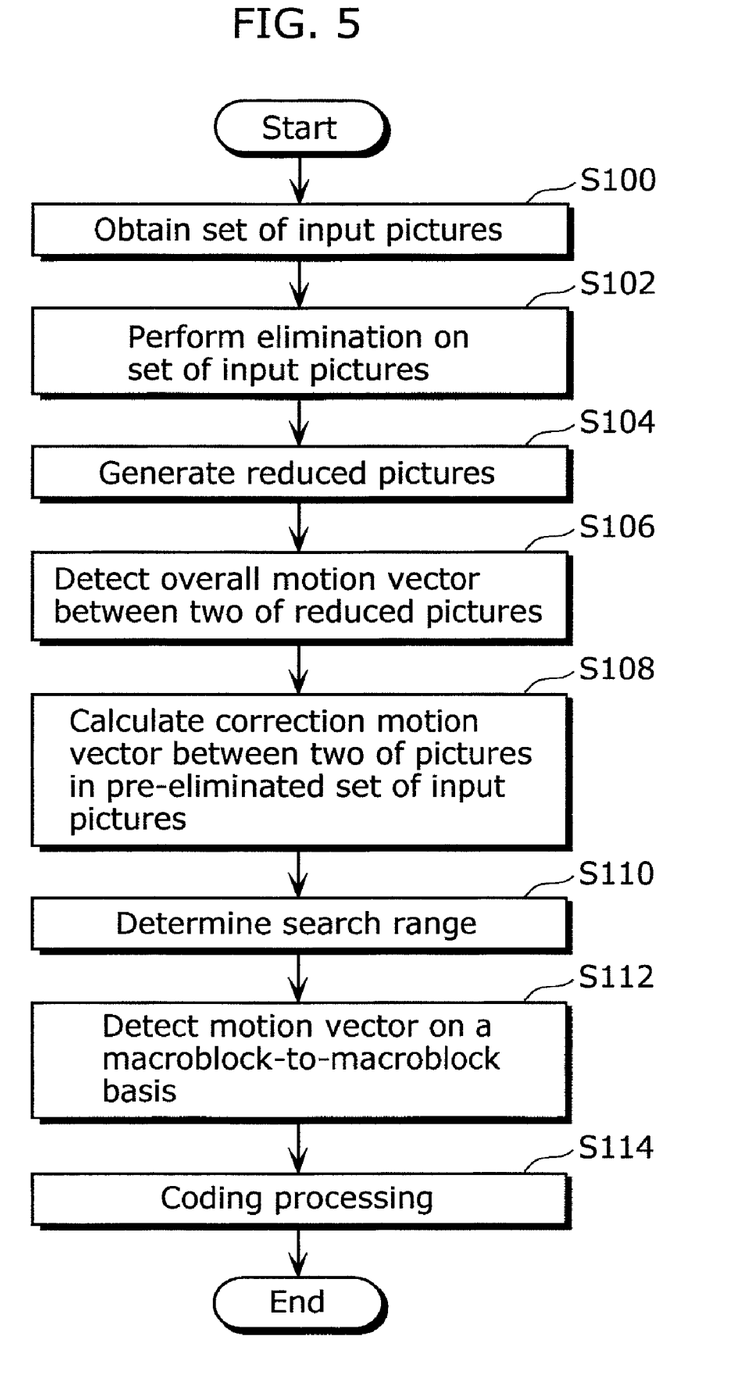
FIG. 5 is a flowchart showing a flow of processing on the moving picture coding apparatus in the first embodiment.

Next, operations of the moving picture coding apparatus 100 structured above shall be described. FIG. 5 is a flowchart showing a flow of processing on the moving picture coding apparatus 100.

First, obtaining the set of input pictures 101 including chronologically sequenced pictures (S100), the eliminating unit 102 performs elimination on the set of input pictures 101 (S102). Following the above, the picture reducing unit 103 generates the reduced pictures of the set of input pictures 101 with elimination performed (S104).

Next, the overall motion vector estimating unit 105 estimates the overall motion vector between the reduced pictures (S106). Then, the correction motion vector calculating unit 106 calculates a correction motion vector between two pictures in the pre-eliminated set of input pictures 101 (S108).

Following S108, based on the correction motion vector, the search range determining unit 107 determines the search range in which coding is performed on a reference picture-to-reference picture basis.

Finally, the coding unit 108: estimates the motion vector (S112); and performs the coding processing to generate the stream (S114). Here, the motion vector is estimated on a macroblock-to-macroblock basis, using the search range determined by the search range determining unit 107.

It is noted that the embodiment is assumed that the eliminating unit 102 always eliminates one picture in a time direction; meanwhile, the eliminating unit 102 can eliminate two or more pictures, as well. In addition, the limitation of the motion compensation in the embodiment is assumed to be the same as the limitation of the motion compensation in the MPEG-2 standard; meanwhile, the limitation of the motion compensation in the embodiment can be set within the limitation of the H.264 standard. For example, a similar structure can be employed in the embodiment when the coding unit 108 compensates a motion of other pictures beyond an I-picture. Moreover, in the case where the search range determining unit 107 searches two or more rectangular areas in one reference picture, the search range determining unit 107 possibly sets different sets of moving distance for each of the search ranges. Further, acceleration can be calculated out of a series of correction motion vectors estimated before when obtaining the correction motion vector. In accordance with a value of the acceleration, an overall motion amount between pictures can be calculated, as well.

In addition, the moving picture coding apparatus including the picture reducing unit 103 is described in the embodiment; meanwhile, the moving picture coding apparatus may be structured without the picture reducing unit 103.

As described above, since eliminating input image to determine a search range, the moving picture coding apparatus in the embodiment can reduce processing amount per current picture, and estimate a motion vector having high accuracy.

Second Embodiment

The above first embodiment has described a scheme to eliminate pictures in conformity with a predetermined rule; meanwhile, a second embodiment shall describe a scheme to selectively change techniques to eliminate pictures.

Figure 6:
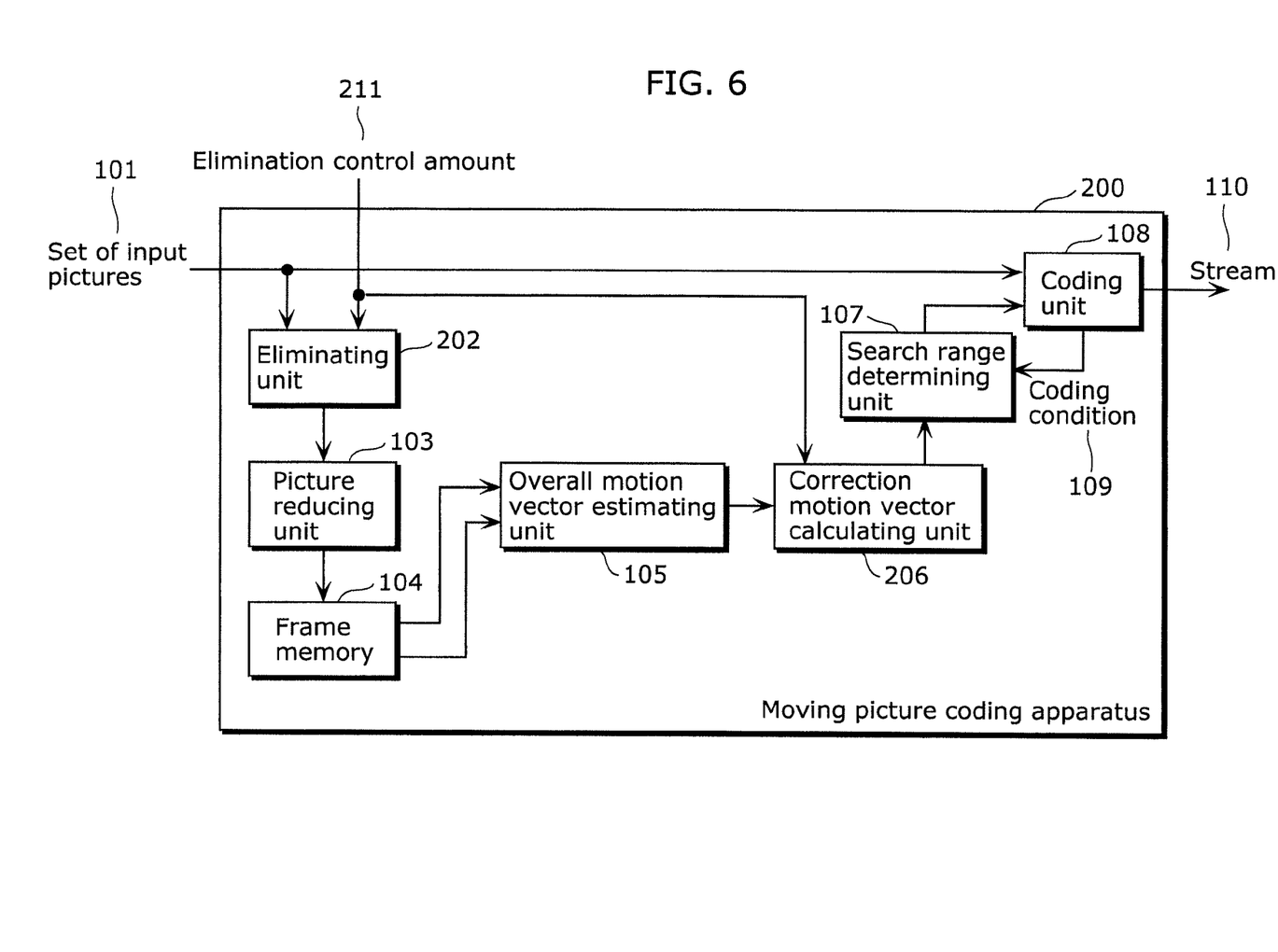
FIG. 6 is a block diagram showing a functional structure of a moving picture coding apparatus in a second embodiment.

FIG. 6 is a block diagram showing a functional structure of a moving picture coding apparatus 200 in the embodiment. As shown in FIG. 6, the moving picture coding apparatus 200 includes a eliminating unit 202, the picture reducing unit 103, the frame memory 104, the overall motion vector estimating unit 105, a correction motion vector calculating unit 206, the search range determining unit 107, and the coding unit 108. As described in the above first embodiment, the second embodiment as well assumes that: 60 pictures a second are provided as the set of input pictures 101; and the coding unit 108 performs coding in conformity with the H.264 standard, and motion compensates the set of input pictures 101, utilizing the same referential relationship as coding in conformity with the MPEG-2 standard. In addition, the second embodiment assumes that the motion vector estimation performed, on a macro block-to-macro block basis, by the coding unit 108 is subject to a search of one rectangular area to one reference picture. The following description focuses on a different functional structure from the functional structure of the moving picture coding apparatus 100 in the first embodiment.

Based on elimination control amount 211, the eliminating unit 202 eliminates pictures in the set of input pictures 101.

The above described first embodiment is assumed to have only one type of elimination scheme (specifically, eliminating every other picture); meanwhile, the second embodiment can selectively change techniques to eliminate the set of input pictures 101.

Based on an overall motion vector estimated out of the eliminate control amount 211 and between reduced pictures, the correction motion vector calculating unit 206 calculates overall motion amount between two inputted pictures as a correction motion vector in the order of the inputted pictures in the pre-eliminated set of input pictures 101. For example, the number of pictures to be eliminated is assumed to be m and an overall motion vector of the n-th picture is referred to as picMVn. Here, a correction motion vector of the k-th picture, corMVk, can be calculated with the following expression (here, n−m≦k≦n, and k, m, n are nonnegative integers).

$$corMVk = 1/(m+1) * picMVn \quad (5)$$

(Here, n−m≦k≦n−1, * represents multiplication)

$$corMVn = picMVn - \Sigma (corMVi) \quad (6)$$

(Here, i=n−m to n−1)

Figure 7:
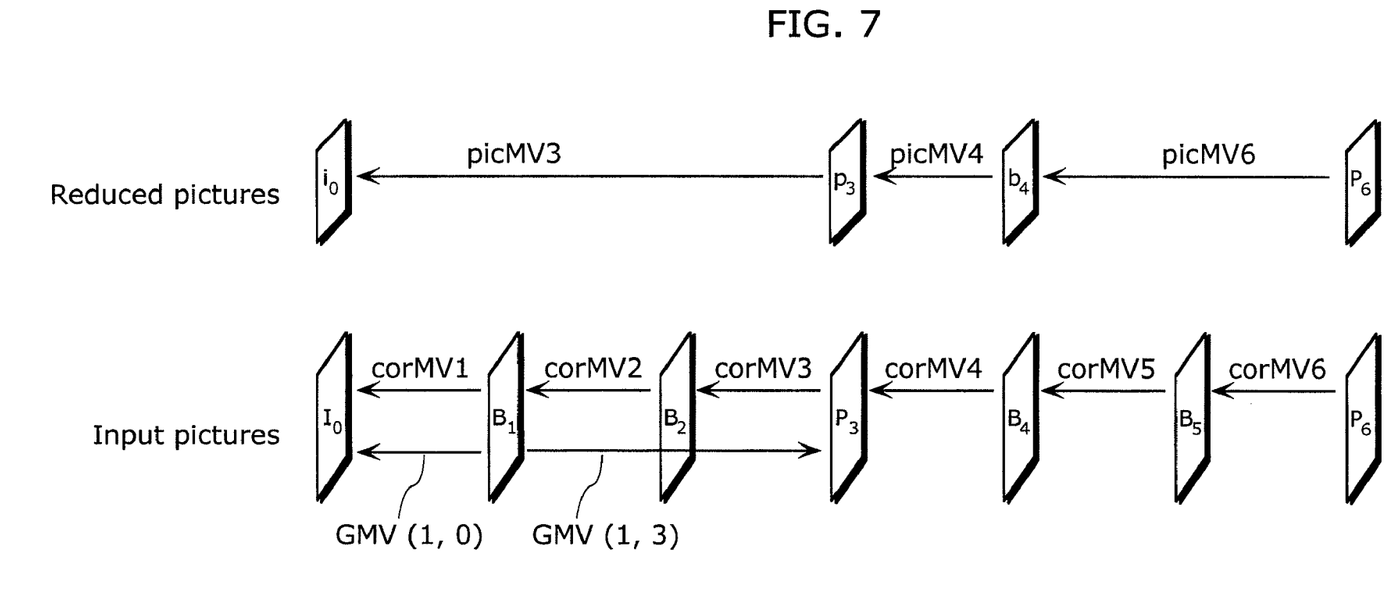
FIG. 7 shows an example of relationship among each of motion vectors in the second embodiment.

Specifically, as shown in FIG. 7, when the eliminating unit 202 eliminates two frames, an overall motion vector of a reduced input picture p3 to a reduced reference picture i0 is designated as "picMV3". Out of "picMV3", the correction motion vector calculation unit 206 calculates "corMV1", "corMV2", and "corMV3". Specifically, the correction motion vector calculation unit 206 calculates the correction motion vector where n=3, and m=2 in the above expression.

$$corMV1 = picMV3/3 \quad (7)$$

$$corMV2 = picMV3/3 \quad (8)$$

$$corMV3 = picMV3 - (corMV1 + corMV2) \quad (9)$$

It is noted that operations, in the second embodiment, following the estimation of the correction motion vector are identical to the operations in the first embodiment.

Out of the correction motion vector and the coding condition 109, the search range determining unit 107 determines the search range for estimating the motion vector on a macro block-to-macro block basis. The coding unit 108: estimates the motion vector; and performs the coding processing to generate the stream 110. Here, the motion vector is estimated for each macro block, within the search range determined by the search range determining unit.

Figure 8:
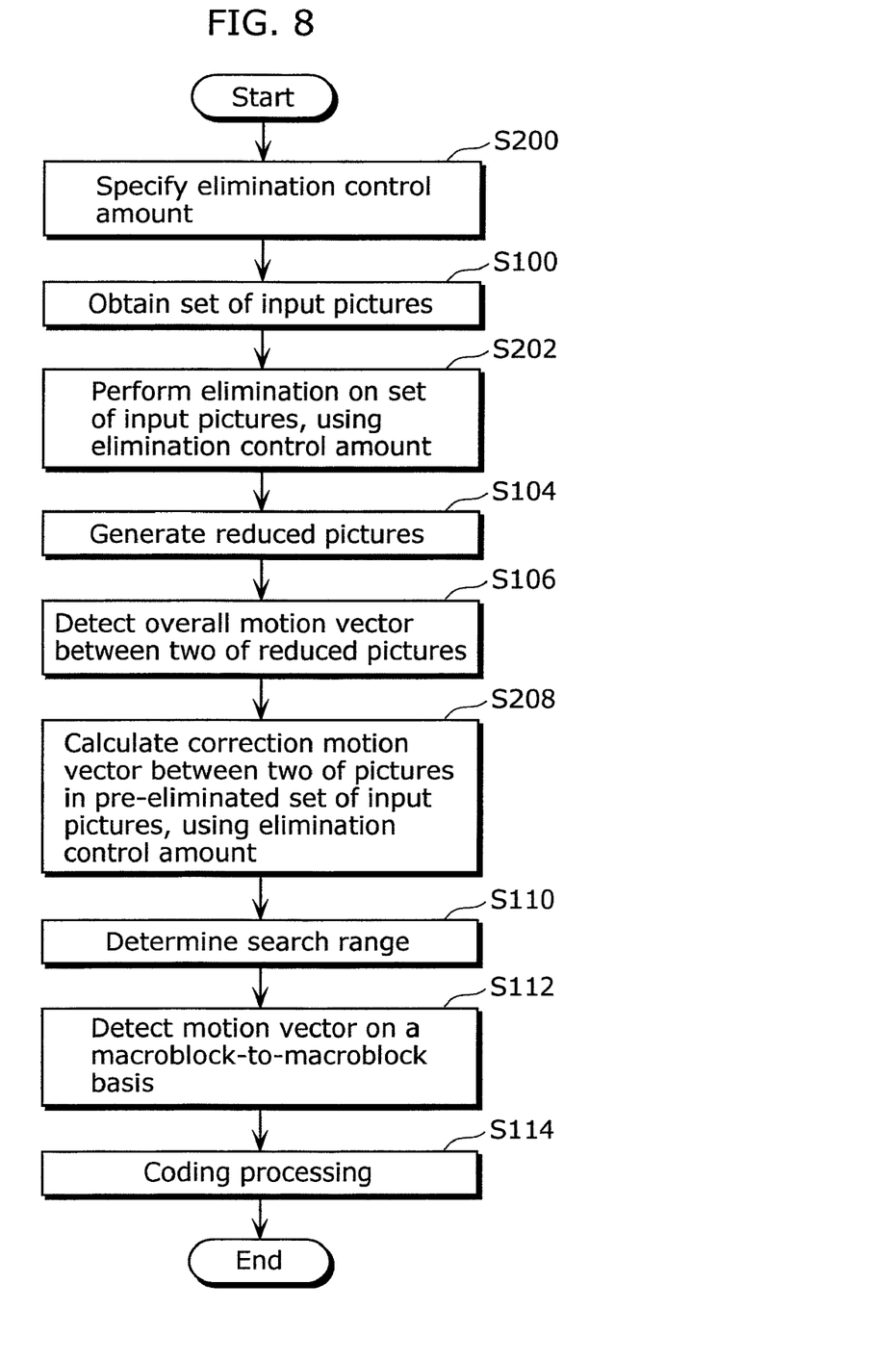
FIG. 8 is a flowchart showing a flow of processing on the moving picture coding apparatus in the second embodiment.

Next, operations of the moving picture coding apparatus 200 structured above shall be described. FIG. 8 is a flowchart showing a flow of processing on the moving picture coding apparatus 200.

First, obtaining the set of input pictures 101 (S100), the eliminating unit 202 performs elimination on the set of input pictures 101 based on the elimination control amount 211 (S202). Following the elimination, the picture reducing unit 103 generates reduced pictures, using the set of input pictures 101 with elimination performed (S104).

Next, the overall motion vector estimating unit 105 estimates the overall motion vector between two reduced pictures (S106). Then, using the elimination control amount 211, the correction motion vector calculating unit 206 calculates a correction motion vector between two pictures in the pre-eliminated set of input pictures 101 (S208).

Following S108, based on the correction motion vector, the search range determining unit 107 determines the search range, in which coding is performed, on a reference picture-to-reference picture basis.

Finally, the coding unit 108: estimates the motion vector (S112); and performs the coding processing to generate the stream (S114). Here, the motion vector is estimated on a macro block-to-macro block basis, using the search range determined by the search range determining unit 107.

It is noted that a determination scheme of the elimination control amount 211 at the eliminating unit 202 is not illustrated herewith; meanwhile, in the case where a magnitude of the motion vector through an entire frame is equal to or smaller than a threshold value, the eliminating unit 202 judges that very little motion is observed in a whole picture, and then, increases the number of frames to be eliminated. In contrast, in the case where the magnitude is greater than another threshold, the eliminating unit 202: judges that motion in the whole picture is significant; and then reduces the number of frames to be eliminated. It is noted that the correction motion vector can also be used instead of the overall motion vector.

Further, the coding unit 108 can also utilize statistical information on the motion vector estimated on a macroblock-to-macroblock basis. The statistical information includes, for example, an average value, variance, and a grouped value with magnitude and direction of motion vectors.

The limitation of the motion compensation in the embodiment is assumed to be the same as the limitation of the motion compensation in the MPEG-2 standard; meanwhile, the limitation of the motion compensation in the embodiment can be set within the limitation of the H.264 standard. For example, a similar structure can be employed in the embodiment when the coding unit 108 motion compensates other pictures beyond an I-picture. Moreover, in the case where the search range determining unit 107 searches two or more rectangular areas in one reference picture, the search range determining unit 107 possibly sets different shift amount for each of the search ranges. Further, acceleration can be calculated out of a correction motion vector estimated before when obtaining the correction motion vector. In accordance with a value of the acceleration, an overall motion amount between pictures can be calculated, as well.

As described above, since determining a search range by selectively eliminating pictures in accordance with characteristics of an input picture, the moving picture coding apparatus in the embodiment can reduce processing amount per current picture, and estimate a motion vector having high accuracy.

Third Embodiment

The above second embodiment has described a scheme to selectively change techniques to eliminate pictures. In addition, a third embodiment shall describe a scheme to divide a reduced input picture into areas and then calculates a correction motion vector for each of the divided areas.

Figure 9:
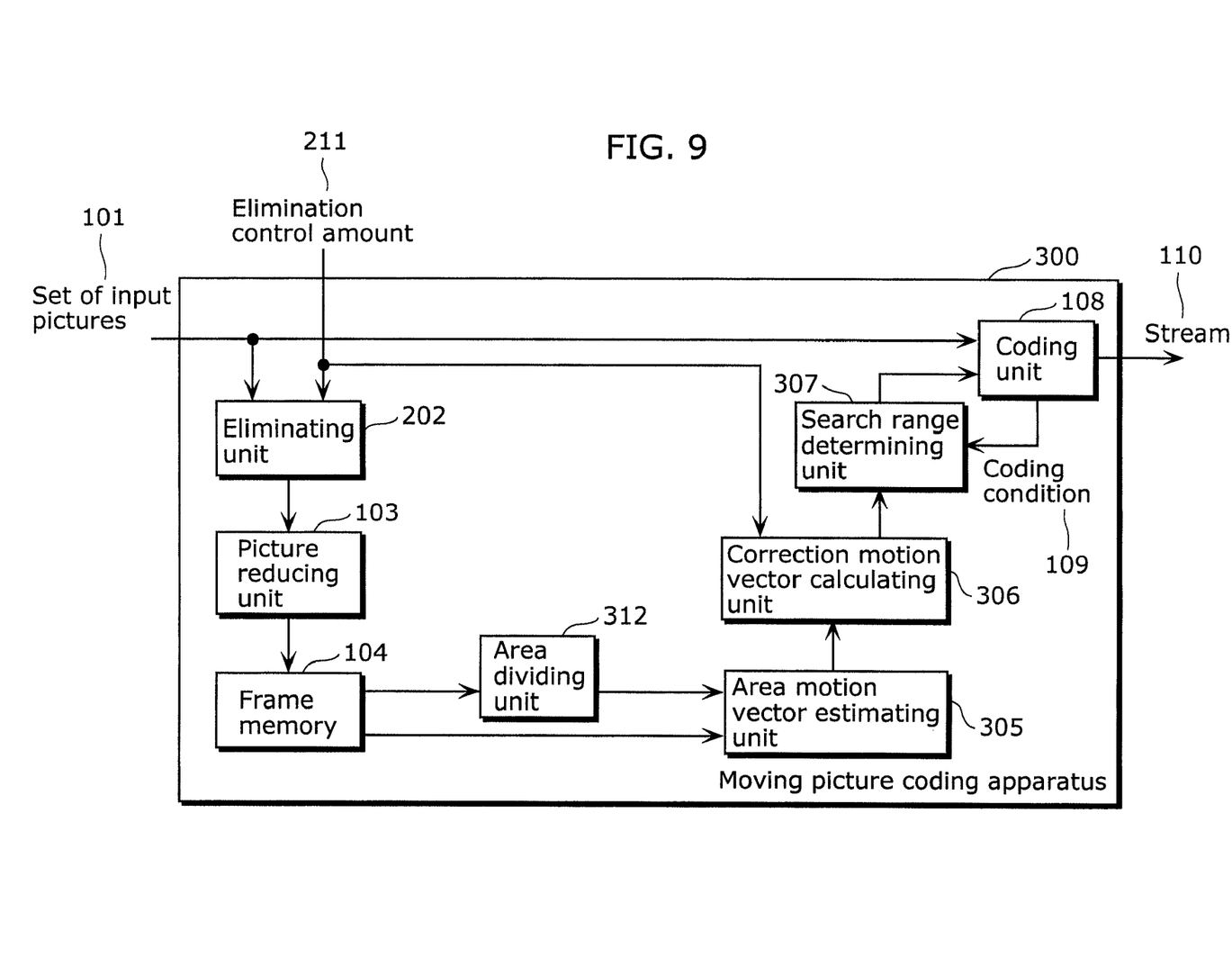
FIG. 9 is a block diagram showing a functional structure of a moving picture coding apparatus in a third embodiment.

FIG. 9 is a block diagram showing a functional structure of a moving picture coding apparatus 300 in the embodiment. As shown in FIG. 9, the moving picture coding apparatus 300 includes the eliminating unit 202, the picture reducing unit 103, the frame memory 104, an area dividing unit 312, an area motion vector estimating unit 305, a correction motion vector calculating unit 306, a search range determining unit 307, and the coding unit 108.

As described in the above first and second embodiments, the third embodiment as well assumes that: the format of the set of input pictures 101 is 60 p; and the coding unit 108 performs coding in conformity with the H.264 standard, and motion compensates the set of input pictures 101, utilizing the same referential relationship as coding in conformity with the MPEG-2 standard. In addition, the embodiment assumes that the motion vector estimation performed, on a macro block-to-macro block basis, by the coding unit 108 is subject to a search of one rectangular area to one reference picture. Moreover, functional structures identical to those of the above second embodiment shall have the same reference numbers, and thus, unique functions to the moving picture coding apparatus 300 shall be chiefly described, hereinafter.

The area dividing unit 312 divides a reduced input picture stored in the frame memory 104 into areas to generate reduced area pictures. Specifically, the area dividing unit 312 divides the reduced input picture into four: half in lengthwise and half in crosswise (or possibly, further division).

The area motion vector estimating unit 305 estimates reduced area pictures and an area motion vector between one of the reduced area pictures and a reduced picture corresponding to the reduced area picture which are stored in the frame memory 104. Using the area motion vector estimated by the area motion vector estimating unit 305, the correction motion vector calculating unit 306 calculates, for each of the reduced area pictures, a motion vector between two reduced area pictures as a correction area motion vector. The correction area motion vector is calculated for each of the reduced area pictures with expressions (5) to (9), utilizing processing identical to the above second embodiment.

Figure 10:
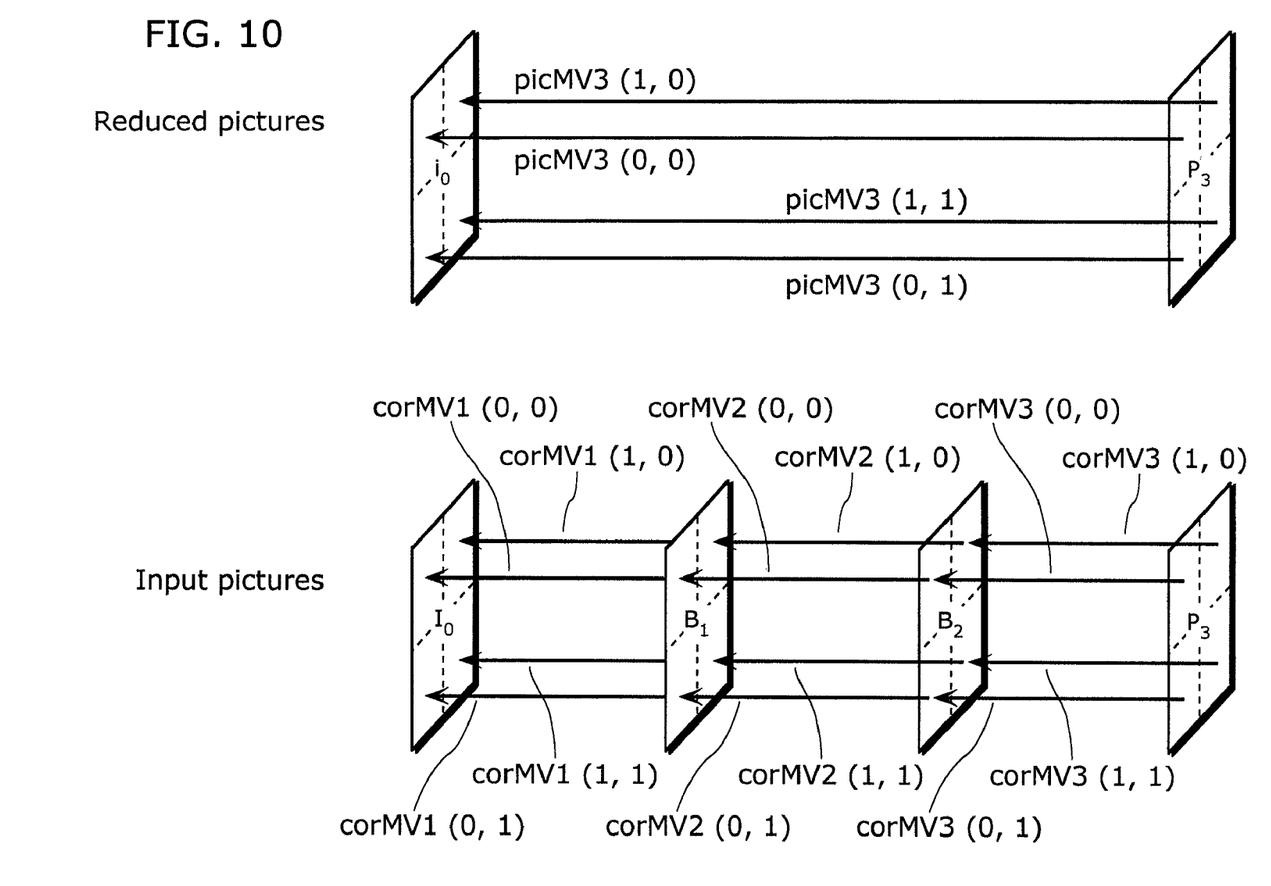
FIG. 10 shows an example of relationship among each of motion vectors in the third embodiment.

As shown in FIG. 10, for example, the area motion vector estimating unit 305 estimates an area motion vector "picMV3 (i, k)" for each of four areas. Here, i and k are either 0 or 1. The correction motion vector calculation unit 306 estimates the correction area motion vector, for each of the four areas, out of the estimated area motion vector. For example, three correction area motion vectors; namely "corMV1 (1,0)", "corMV2 (1,0)", and "corMV3 (1,0)", are calculated out of "picMV3 (1,0)".

The search range determining unit 307 determines a search range, using the coding condition 109, and the correction area motion vector calculated for each of the reduced area pictures. In order to obtain shift amount of the search range, the search range determining unit 307 calculates an overall motion vector, using various processing schemes. Such processing schemes include: a determination, for the correction area motion vectors, of an average, a median, and a representative value when grouping with a magnitude and a direction; and a calculation of the most suitable vector value out of variance of the correction area motion vectors. Further, when searching several rectangular areas in one reference picture, the search range determining unit 307 can also set different sets of shift amount for each of the rectangular areas. Here, several representative motion vectors are selected (or calculated) as the different sets of shift amount, using the correction area motion vectors. In addition, the search range, in which a motion vector of a macro block in each of the areas is estimated, can be determined: with a correction area motion vector calculated in the area; and for each of the reference pictures and each of the areas.

Figure 11:
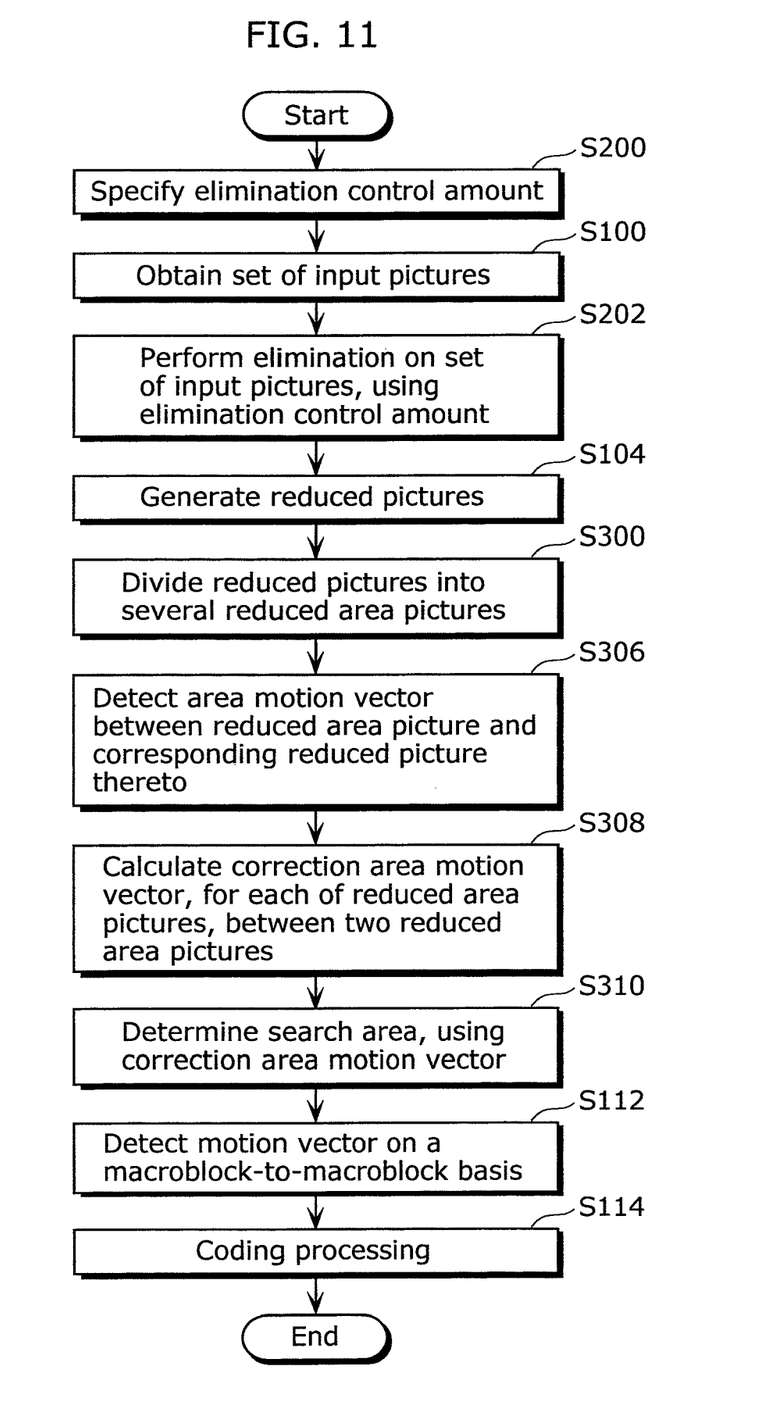
FIG. 11 is a flowchart showing a flow of processing on the moving picture coding apparatus in the third embodiment.

Next, operations on the moving picture coding apparatus 300 structured above shall be described. FIG. 11 is a flowchart showing a processing flow of the moving picture coding apparatus 300.

First, when obtaining the set of input pictures 101 (S100), the eliminating unit 102 performs elimination on the set of input pictures 101 based on the elimination control amount 211 (S102). Following the above, the picture reducing unit 103 generates the reduced pictures, using the set of input pictures 101 with elimination performed (S104).

Next, the area dividing unit 312 divides each of the reduced pictures into areas (S300).

Then, the area motion vector estimating unit 305 estimates an area motion vector between a reduced area picture and the reduced picture corresponding to another reduced area picture (S306). Using the area motion vector estimated by the area motion vector estimating unit 305, the correction motion vector calculating unit 306 calculates, for each of the reduced area pictures, a correction motion vector between the reduced area pictures (S308).

Then, based on the calculated correction area motion vector, the search range determining unit 307 determines a search range, in which coding is performed, on a reference picture-to-reference picture basis (S310).

Finally, the coding unit 108: estimates the motion vector (S112); and performs the coding processing to generate the stream (S114). Here, the motion vector is estimated for each macro block, using the search range determined by the search range determining unit 107.

It is noted that the limitation of the motion compensation in the embodiment is assumed to be the same as the limitation of the motion compensation in the MPEG-2 standard; meanwhile, the limitation of the motion compensation in the embodiment can be set within the limitation of the H.264 standard. For example, a similar structure can be employed in the embodiment when the coding unit 108 motion compensates other pictures beyond an I-picture. Further, acceleration can be calculated out of a correction motion vector estimated before when obtaining the correction motion vector. In accordance with a value of the acceleration, an overall motion amount between pictures can be calculated, as well.

Moreover, the above-described first, second and third embodiments assume to have a set of input pictures in accordance with a progressive scheme providing 60 pictures per second (60 p); meanwhile, the embodiments may have a set of input pictures in accordance with an interlace scheme providing 60 fields per second (60 i), instead of 60 p. In the case of the 60 i, an overall motion vector between first fields (or second fields) is estimated, following a correction motion vector between fields, and further, an overall motion vector between a picture to be coded and a reference picture.

As described above, since determining a search range by selectively eliminating pictures in accordance with characteristics of input pictures, and by calculating a motion vector for each of divided areas, the moving picture coding apparatus in the third embodiment can reduce processing amount per current picture, and estimate a motion vector having high accuracy.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The moving picture coding apparatus and a method thereof can be used for a video recorder, for digital TV broadcasting, which compression-codes a picture using inter-picture prediction, and for a digital camera and a camera-equipped cellular phone recording a moving picture.

What is claimed is:
1. A moving picture coding apparatus which codes a current picture, on a predetermined block-to-block basis, out of a set of input pictures, said moving picture coding apparatus comprising:

an eliminating unit configured to eliminate a predetermined picture from the set of input pictures;

an overall motion vector estimating unit configured to (i) estimate a motion vector for the entirety of a picture between pictures included in the set of input pictures after the elimination and (ii) set the estimated motion vector as an overall motion vector;

a correction motion vector calculating unit configured to calculate a correction motion vector representing a motion vector for the entirety of the current picture, the correction motion vector being calculated based on the estimated overall motion vector and a ratio between (i) a first time interval representing a time interval between the pictures used for estimating the overall motion vector and (ii) a second time interval representing a time interval between the current picture and a reference picture corresponding to the current picture;

a search range determining unit configured to determine a search range, to be searched, in which a motion vector of the current block is to be estimated, the search range being determined based on the calculated correction motion vector and a predetermined coding condition; and a coding unit configured to estimate the a motion vector of the current block by searching the determined search range, and to code the current block with use of the estimated motion vector of the current block.

2. The moving picture coding apparatus according to claim 1, further comprising
a picture reducing unit configured to generate reduced input pictures by reducing the pictures in the set of input pictures after the elimination,
wherein said overall motion vector estimating unit estimates the motion vector for the entirety of the picture between the pictures included the set of input pictures after the elimination using the generated reduced input pictures.

3. The moving picture coding apparatus according to claim 1, wherein the predetermined coding condition represents reference picture information indicating a picture type and a picture to be referred to, when coding the current picture.

4. The moving picture coding apparatus according to claim 1,
wherein said eliminating unit is configured to perform the elimination based on an elimination control amount representing an elimination amount of the elimination, and
wherein said correction motion vector calculating unit is configured to calculate the correction motion vector based on the elimination control amount.

5. The moving picture coding apparatus according to claim 4,
wherein the elimination control amount indicates the elimination amount is to be reduced in the case where either a magnitude of the overall motion vector or a magnitude of the correction motion vector is greater than a predetermined threshold value.

6. The moving picture coding apparatus according to claim 5,
wherein the elimination control amount indicates the elimination amount is to be increased in the case where either the magnitude of the overall motion vector or the magnitude of the correction motion vector is smaller than the predetermined threshold value.

7. A moving picture coding method for coding a current picture, on a predetermined block-to-block basis, out of a set of input pictures, said moving picture coding method comprising:

eliminating a predetermined picture from the set of input pictures;

estimating a motion vector for the entirety of a picture between pictures included in the set of input pictures after said eliminating, and setting the estimated motion vector as an overall motion vector;

calculating a correction motion vector representing a motion vector for the entirety of the current picture, the correction motion vector being calculated based on the estimated overall motion vector and a ratio between (i) a first time interval representing a time interval between the pictures used for estimating the overall motion vector and (ii) a second time interval representing a time interval between the current picture and a reference picture corresponding to the current picture;

determining a search range, to be searched, in which a motion vector for the current block is to be estimated, the search range being determined based on the calculated correction motion vector and a predetermined coding condition; and estimating the motion vector of the current block by searching the determined search range, and coding the current block with use of the estimated motion vector of the current block.

8. A non-transitory computer-readable recording medium having stored thereon a computer program recorded for coding a current picture, on a predetermined block-to-block basis, out of a set of input pictures, wherein, when executed, said computer program causes a computer to execute a method comprising:

eliminating a predetermined picture from the set of input pictures;

estimating a motion vector for the entirety of a picture between pictures included in the set of input pictures after said eliminating, and setting the estimated motion vector as an overall motion vector;

calculating a correction motion vector representing a motion vector for the entirety of the current picture, the correction motion vector being calculated based on the estimated overall motion vector and a ratio between (i) a first time interval representing a time interval between the pictures used for estimating the overall motion vector and (ii) a second time interval representing a time interval between the current picture and a reference picture corresponding to the current picture;

determining a search range, to be searched, in which a motion vector for the current block is to be estimated, the search range being determined based on the calculated correction motion vector and a predetermined coding condition; and estimating the motion vector of the current block by searching the determined search range, and coding the current block with use of the estimated motion vector of the current block.

9. An integrated circuit for coding a current picture, on a predetermined block-to-block basis, out of a set of input pictures, said integrated circuit comprising:

an eliminating unit configured to eliminate a predetermined picture from the set of input pictures;

an overall motion vector estimating unit configured to (i) estimate a motion vector for the entirety of a picture between pictures included in the set of input pictures after the elimination and (ii) set the estimated motion vector as an overall motion vector;

a correction motion vector calculating unit configured to calculate a correction motion vector representing a motion vector for the entirety of the current picture, the correction motion vector being calculated based on the estimated overall motion vector and a ratio between (i) a first time interval representing a time interval between the pictures used for estimating the overall motion vector and (ii) a second time interval representing a time interval between the current picture and a reference picture corresponding to the current picture;

a search range determining unit configured to determine a search range, to be searched, in which a motion vector of the current block is to be estimated, the search range being determined based on the calculated correction motion vector and a predetermined coding condition; and a coding unit configured to estimate the motion vector of the current block by searching the determined search range, and to code the current block with use of the estimated motion vector of the current block.

10. The moving picture coding apparatus according to claim 1, wherein said search range determining unit determines the search range by shifting a reference position of the search range based on the calculated correction motion vector and the predetermined coding condition.

* * * * *